United States Patent [19]

Kaneko et al.

[11] Patent Number: 5,042,061
[45] Date of Patent: Aug. 20, 1991

[54] STILL IMAGE VIDEO TELEPHONE TRANSMISSION SYSTEM

[75] Inventors: Koji Kaneko; Kazuyuki Saigusa; Shinya Yokodate; Hitoshi Fujimoto; Akira Teshima; Tatsuhiko Mizushima, all of Kamakura, Japan; Gary S. Fletcher, Willard Rocklin, Calif.; Janet Miller; Lawrence D. Emmons, both of Grass Valley City, Calif.

[73] Assignee: Mitsubishi Denki Kabushiki Kaisha, Tokyo, Japan

[21] Appl. No.: 565,486

[22] Filed: Aug. 10, 1990

[30] Foreign Application Priority Data

Oct. 23, 1989 [JP] Japan .................................. 1-275181

[51] Int. Cl.$^5$ .............................................. H04N 1/42
[52] U.S. Cl. ........................................ 379/53; 358/85
[58] Field of Search ........................... 379/53, 54, 202; 358/85, 78, 80

[56] References Cited

U.S. PATENT DOCUMENTS

| | | |
|---|---|---|
| 4,258,387 | 3/1981 | Lemelson et al. . |
| 4,485,400 | 11/1984 | Lemelson et al. . |
| 4,943,994 | 7/1990 | Ohtsuka et al. .................... 358/85 |
| 4,979,028 | 12/1990 | Minematsu et al. ................ 358/85 |
| 4,985,911 | 1/1991 | Emmons et al. .................... 379/53 |

Primary Examiner—Jin F. Ng
Assistant Examiner—Ahmad F. Matar

[57] ABSTRACT

A still picture video telephone transmission system for transmitting and receiving, via a telephone line, a still picture taken by a camera; a picture signal is transmitted and received by a transmitting circuit and a receiving circuit, to which improvements are made so as to display a still picture clearly without distortion. For this purpose, the transmitting circuit sends picture element signals together with image correcting signals such as a picture element displacement detecting signal, a phase inversion detecting signal, and settling data. The receiving circuit detects the image correcting signals in the picture element signal, and makes the necessary corrections so as to enable the still picture to be displayed in good shape.

11 Claims, 21 Drawing Sheets

FIG.16

TRANSMISSION SEQUENCE →

| S1 | 1ST LINE PICTURE BLOCK | S2 | S1 | 2ND LINE PICTURE BLOCK | S2 | S1 | ... | S2 | S1 | LAST LINE PICTURE BLOCK | S2 |

FIG.17

TRANSMISSION SEQUENCE →

COLOR DIFFERENTIAL

| S1 | 1ST LINE PICTURE BLOCK | S2 | S1 | 2ND LINE PICTURE BLOCK | S2 | R-Y | S1 | B-Y | S2 |
| S1 | 3RD LINE PICTURE BLOCK | S2 | S1 | 4TH LINE PICTURE BLOCK | S2 | R-Y | S1 | B-Y | S2 |
| S1 | LAST LINE PICTURE BLOCK | S2 | | | | R-Y | S1 | B-Y | S2 |

STILL IMAGE VIDEO TELEPHONE TRANSMISSION SYSTEM

BACKGROUND OF THE INVENTION

1. Field of the invention

This invention relates to a still image video telephone transmission system in which a still picture taken by a video camera is sent to telephone lines during talking over telephone, and more particularly to improvement of a transmitting means and a receiving means so as to correct deteriorated picture signals sent over a transmission path.

2. Description of Related Art

Heretofore video telephones have been developed and widely used in which still picture data are modulated into an audible frequency signal and are sent via telephone lines.

FIG. 20 of the accompanying drawing is a block diagram showing this kind of still image video telephone disclosed in "Details of TTC Standard TV Telephone System," page 31, TV Technique, issued September, 1988.

In FIG. 20, reference numeral 1 designates a still image video telephone transmission system; 2, telephone lines; 3, an external telephone set; 4, a network control unit for inputting/outputting picture information and switching the connection between the video telephone transmission system and the external telephone set 3; 5, a modem circuit for modulating-/demodulating the picture data so as to transmit the data via the telephone lines; 6, a demodulation timing recovering circuit for recovering a timing to be used by the modem circuit 5; 7, an A/D converter for converting analog data demodulated by the modem circuit 5 into digital data; 8, a keypad for triggering transmission and various operations; 9, a display for showing a picture of a speaker and that of a counterpart; 10, a video camera; 11, a picture information memory; 12, a picture control circuit to write/read the picture data into/from the picture information memory 11, to output the picture signal to the display 9, and to input the picture signal from the video camera 10; 13, a D/A converter to convert the digital picture signal from the picture control circuit 12 into an analog picture signal and send the analog picture signal to the display 9; 14, an A/D converter to convert the analog picture signal outputted from the video camera 10 into a digital picture signal and to send the digital picture signal to the picture control circuit 12; 15, a central processing unit (hereinafter referred to as CPU) comprising a microcomputer including a ROM and RAM, and processing signals throughout the video telephone transmission system.

FIG. 21 illustrates a method to modulate the picture data by the video telephone transmission system of FIG. 20. This kind of modulation system is based on an amplitude-phase modulation system (hereinafter referred to as AM-PM system) in which amplitude information and phase information are transmitted in combination. The modulation of the picture data having a picture element with luminance "16" will be described with reference to FIG. 21.

As shown in FIG. 21, there are two phases: a first phase of a sine curve type, and a second phase of-sine type different by 180° from the first phase, each of the first and second phases being composed of signals having 8-level amplitudes.

Further, the particular phase and the particular amplitude of one cycle of signal corresponds to respective particular luminancees. In the illustrated example, each phase is eight cycles, i.e., sixteen cycles in total. As is apparent from FIG. 21, the signal "0" of the maximum amplitude of the first phase corresponds to black. The intermediate signals "1" to "14" correspond to gray of respective luminancees. The signal "15" of the maximum amplitude of the second phase corresponds to white.

FIG. 22 is a diagram schematically showing a data format of the conventional system. In FIG. 22, reference numeral 16 designates picture control information including a gain control signal for receiving the picture signal and a picture mode signal; 17, picture data; 18, a dual tone signal for notifying arrival of the picture data 17; and 19, a hardware preamble notifying arrival of the picture data 17. The picture data 17 of the picture element at the upper left side of the screen are sent first and then those for the succeeding picture elements are sent laterally to the right in succession, then are returned to the leftmost side of the line below a first line after they reach the rightmost position, and are sent laterally again.

The operation of the conventional system of FIG. 20 will be described below. First, the put/output signal from the telephone set 3 is broken, and the picture signal from the modem circuit 5 is made ready for outputting the picture signal to the telephone lines 2. Then the CPU outputs the picture control signal (shown in FIG. 18) to the telephone lines 2 through the modem circuit 5. The CPU 15 receives picture data sequentially from the picture information memory 11 via the picture control circuit 12, and sends the picture signal to the modem circuit 5. When the picture data for one picture is transmitted, the network control unit 4 switches the connection to the telephone set.

To receive a still picture, when the modem circuit 5 detects either the dual tone 18 or the hardware preamble in the picture control information 16 shown in FIG. 22, the CPU 15 receives a notice to start receiving information. The CPU 15 switches the network control unit 4 ready for receiving the picture, starting receiving information. The received picture signal is demodulated by the modem circuit 5 and the demodulation timing recovering circuit 6, is converted into a digital signal by the A/D converter 7, and then forwarded to the CPU 15. The picture data for one picture sent to the CPU 15 are sequentially stored in the picture information memory 11 via the picture control circuit 12.

The picture data stored in the picture information memory 11 are sequentially read out via the picture control circuit 12, and are sent to the display 9 so as to have the picture displayed on the screen. Now the speaker can talk while observing the still picture from the other party.

However, in the conventional still image video telephone transmission system, the following disadvantages have been experienced.

(1) When a number of non-particular signals are being sequentially received as picture element signals, clocks outputted by a clock reforming PLL circuit in the modem circuit 5 are displaced by one picture element due to noises or a frequency shift of AM-PM signal over a transmission path, and a picture is received in a slanted condition.

(2) Even if the clock outputted by the carrier recovery circuit PLL in the modem circuit is displaced by 180° due to factors such as noises during the reception of the picture element signals, it is impossible for the receiving side to know this fact. This leads to false recognition of the first and second phases, and makes the received picture be displayed with the black and white colors inverted on the display.

(3) The picture element signals for the right end of the picture and the left end of the next line are transmitted in succession. Generally the signals for adjacent picture elements are less correlated. Therefore, the picture elements remote from each other have very different waveforms due to the large luminance or color difference. And as a result, these signals influence each other, distorting the signal waveforms, and adversely affecting the luminances or colors of the received picture at the right and left sides of the display.

SUMMARY OF THE INVENTION

It is therefore an object of this invention to provide a still image video telephone transmission system, in which a clear still picture can be reproduced.

According to a first aspect of this invention, there is provided a still image video telephone transmission system for transmitting and receiving, via a telephone lines, a still picture taken by a camera, comprising a transmitting means and a receiving means. The transmitting means includes a means for converting analog signals from a video camera into digital signals; a means for modulating phase and amplitude of the digital signals, composing a screen picture frame signal including a plurality of groups of picture blocks made of a plurality of picture element signals, and transmitting the signal; an a means for adding a picture correcting signal to each picture element signal or a picture block. The receiving means includes a means for receiving the screen picture frame signal, demodulating the picture frame signal, subjecting the frame signal to D/A conversion, and indicating a still picture on a display; a means for extracting clocks from the received screen picture frame signal; a means for demodulating picture element signals of the screen picture frame signal into picture element data; a picture memory for counting the clocks and storing picture element data by using a counted value as an address; and a correcting means for correcting the picture element data in the picture memory according to a condition of the extracted picture correcting signal.

In this still image video telephone transmission system, the picture correcting signal is a pair of picture element displacement detecting signals having two different predetermined phases and amplitudes. The pair of the picture element displacement detecting signals are picture element signals having a plurality of cycles. The pair of picture element displacement detecting signals are two different picture element signals corresponding to picture element data for white and black colors, respectively.

The correcting means includes a counter means for counting the number of clocks between a predetermined transition point of a pair of picture element signals in the received picture element displacement detecting signal and another transition point in a pair of picture element signals in a succeeding picture element displacement detecting signal; a means for determining whether or not the number of counted clocks is equal to the predetermined number of clocks existing between two transition points; a differential means for determining that there exists picture element displacement when the above two numbers are not equal to each other and for calculating the difference between the number of counted clocks and the predetermined number of clocks existing between the two transition point; and a reloading means for correcting and reloading a differential address of picture element data stored in a picture element memory succeeding a picture element memory where picture element displacement has occurred.

With the first arrangement of this invention, the number of reproduced clocks is counted between a transition point in picture element data in a certain picture element displacement detecting signal and another transition point in picture element data in a succeeding picture element displacement detecting signal. If the number of the counted clocks differs from the predetermined value, displacement of the picture element will be corrected.

According to a second aspect of the invention, a still image video telephone transmission system for transmitting and receiving, via telephone lines, a still picture taken by a camera, comprises a transmitting means and a receiving means, both of which are similar to those in the first aspect of this invention. The transmitting means further includes a means for adding a picture correcting signal to each picture element signal or a picture block. The receiving means further includes a means for extracting clocks from the received screen picture frame signal; a means for demodulating picture element signals of the screen picture frame signal into picture element data; a picture memory for storing picture element data; an inversion information memory for determining presence or absence of phase inversion based on the received phase inversion detecting signal and for storing a picture element number where phase inversion occurs; and a correcting means for correcting the picture element data in the picture memory according to the phase inversion information stored in the phase inversion memory.

The phase inversion detecting signal is a picture element signal having a predetermined phase and amplitude. The correcting means includes a first correcting means for inverting phases of picture element blocks succeeding the picture block where phase inversion has occurred, and for reloading picture block in the picture memory. The correcting means further includes a second correcting means for replacing data of the picture block subjected to phase inversion in the picture memory with data of a picture block which is most adjacent to, before or after, a normal picture block, according to the picture block number stored in the inversion information memory.

With the second arrangement of this invention, the phase of the picture data blocks succeeding the picture data block having an inverted phase are corrected as well as the picture data block where the phase inversion has actually taken place, so that a still picture substantially free from distortion can be displayed.

The phase inversion detecting signal is a picture element signal having predetermined phase and amplitude.

According to a third aspect of the invention, there is provided a still image video telephone transmission system for transmitting and receiving, via telephone lines, a still picture taken by a camera, comprising: a transmitting means including (1) means for converting analog signals output from a video camera into digital signals, (2) means for modulating phase and amplitude of the digital signals and transmitting picture frame signal consisting of one or more picture element signals for one or more lines or files, and (3) means for adding a first settling signal which is same as the picture element signal at a leading edge of a line or file picture block to each line or to immediately before a line file picture block; and a receiving means including (3) means for demodulating the screen picture frame signal, (4) means for subjecting the screen picture frame signal to D/A conversion, (5) means for demodulating the first settling signal and the second settling signal into picture element data according to the received clocks, and (6) a image memory for storing the remaining picture element data.

With the third arrangement of the invention, the picture element signals at the head or end of the lines or file picture blocks are transmitted in overlapped relation. The overlapped picture element signals are influential to each other when these signals have different waveforms. As a result, the picture data at the head or end of the line or file picture block are prevented from being affected by these overlapped signals.

The above and other advantages, features and additional objects of this invention will be manifest to those versed in the art upon making reference to the following detailed description and the accompanying drawings in which preferred structural embodiments incorporating the principles of this invention are shown by way of illustrative example.

BRIEF DESCRIPTION OF THE DRAWINGS

FIG. 16 is a diagram showing the transmission system of the screen picture frame signal of a line block in the system of the third embodiment;

FIG. 17 is a diagram showing the transmission system of the screen picture frame signal including the line picture block signal and the color difference signal of the system of the third embodiment;

DETAILED DESCRIPTION

The principles of this invention are particularly useful when embodied in a still image video telephone transmission system (hereinafter also referred to as "system").

FIGS. 1 through 6 show a first embodiment of the system.

Construction

The construction of the system of the first embodiment is similar to that of the prior art system and is realized by software of a CPU.

Figure 1:
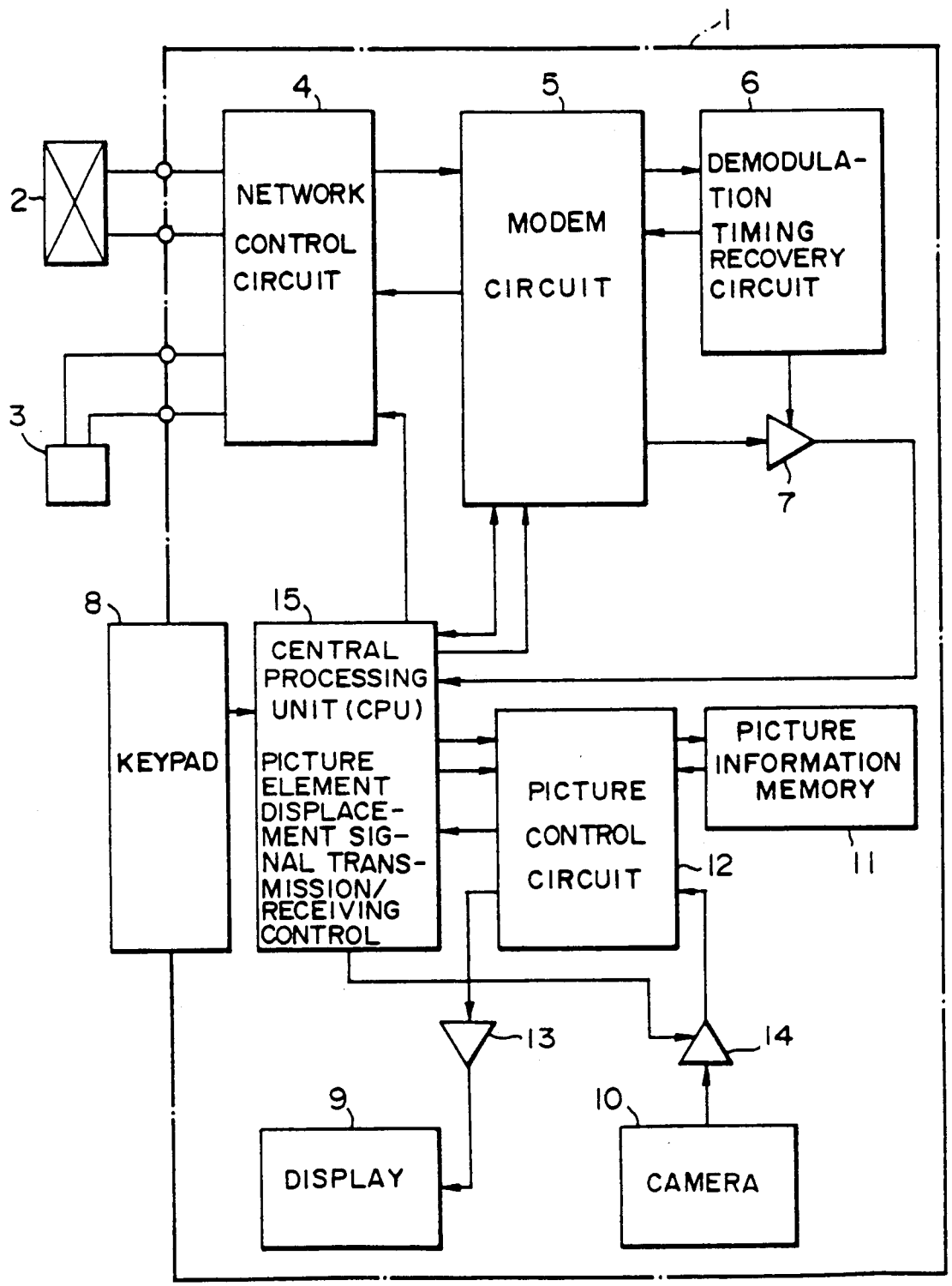
FIG. 1 is a block diagram showing a still image video telephone transmission system according to one embodiment of this invention, in which a central processing unit (hereinafter referred to as "CPU") performs transmitting and receiving of a picture element displacement detecting signal.
Figure 2:
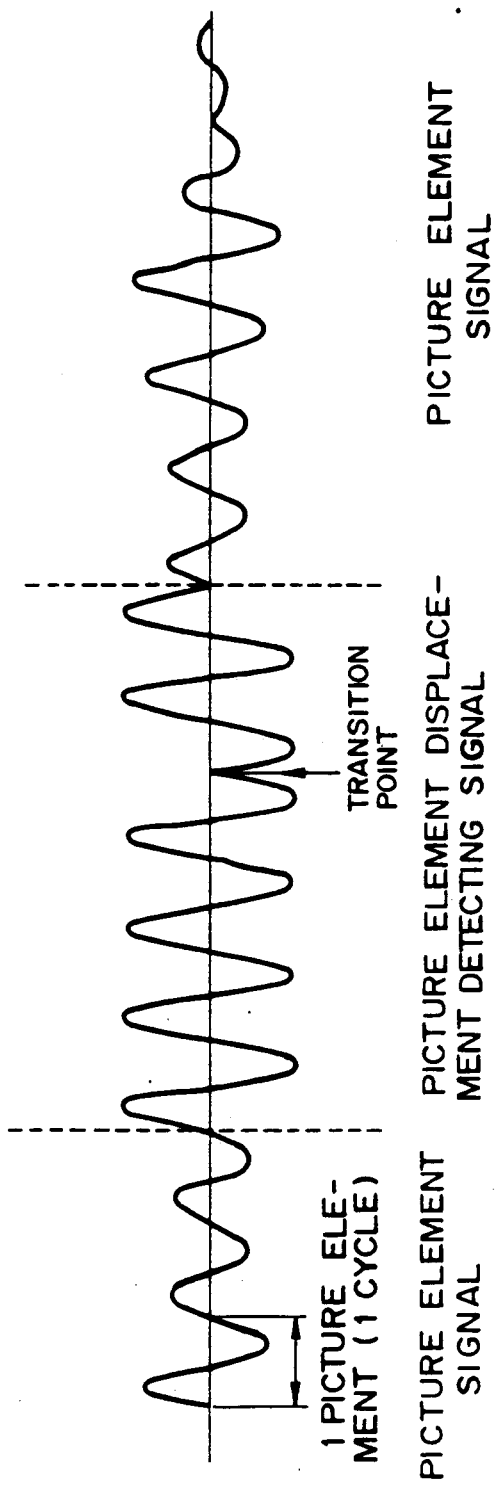
FIG. 2 is a diagram showing waveforms of a picture element displacement detecting signal in a picture frame signal outputted from the system shown in FIG. 1 and showing a transition point at the boundary between the fourth cycle and the fifth cycle.
Figure 3:
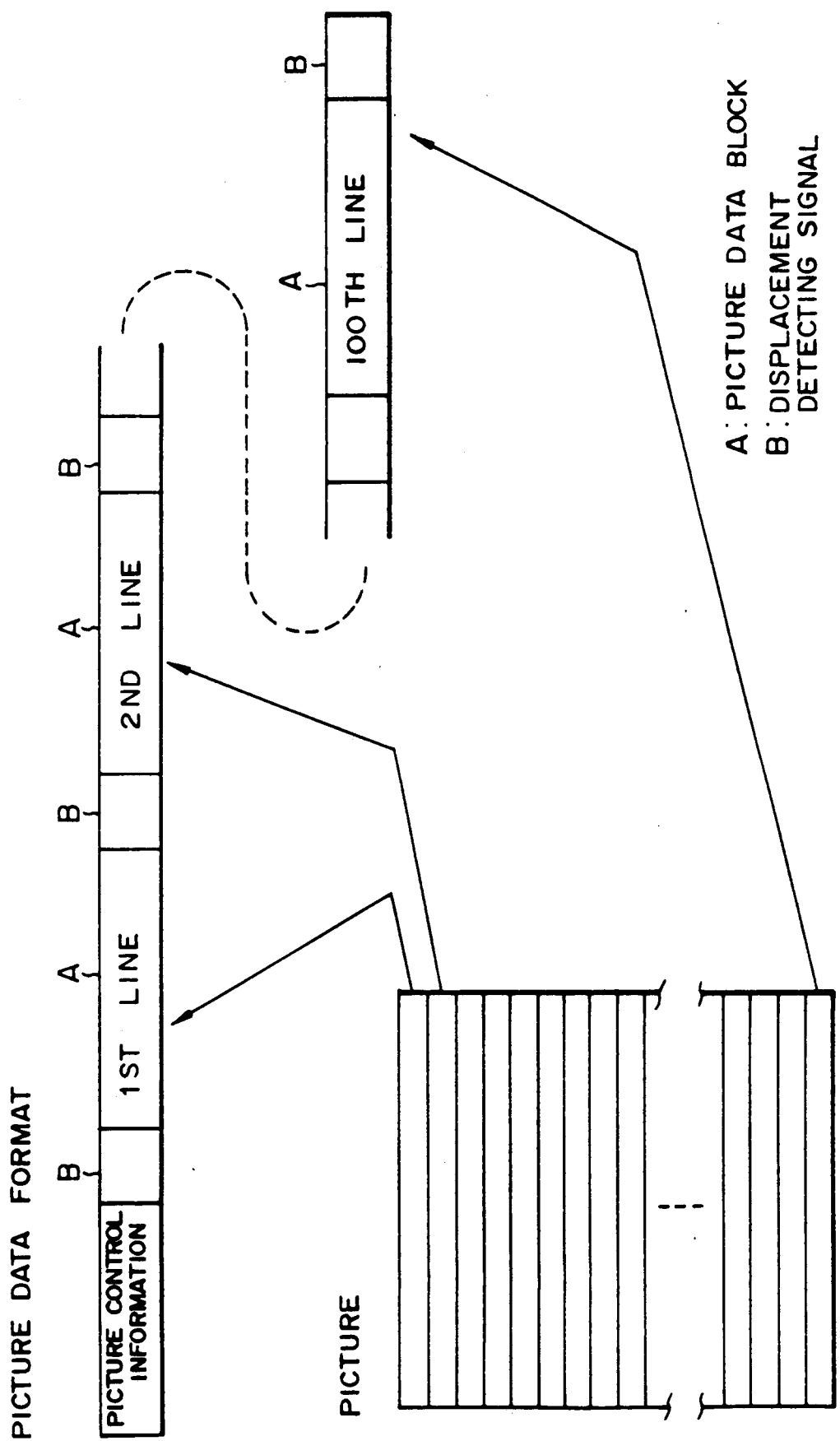
FIG. 3 is a diagram showing the transmission system of the picture frame signal in the system of FIG. 1.

FIG. 3 shows a transmission signal that is provided by adding a picture element displacement detecting signal to the conventional one at regular time intervals. FIG. 2 shows an example of the picture element displacement detecting signal, which is composed of six cycles (six picture elements) and varies in phase at the transition point between the fourth cycle and the fifth cycle.

Operation

The transmitting action will be described first.

Figure 4:
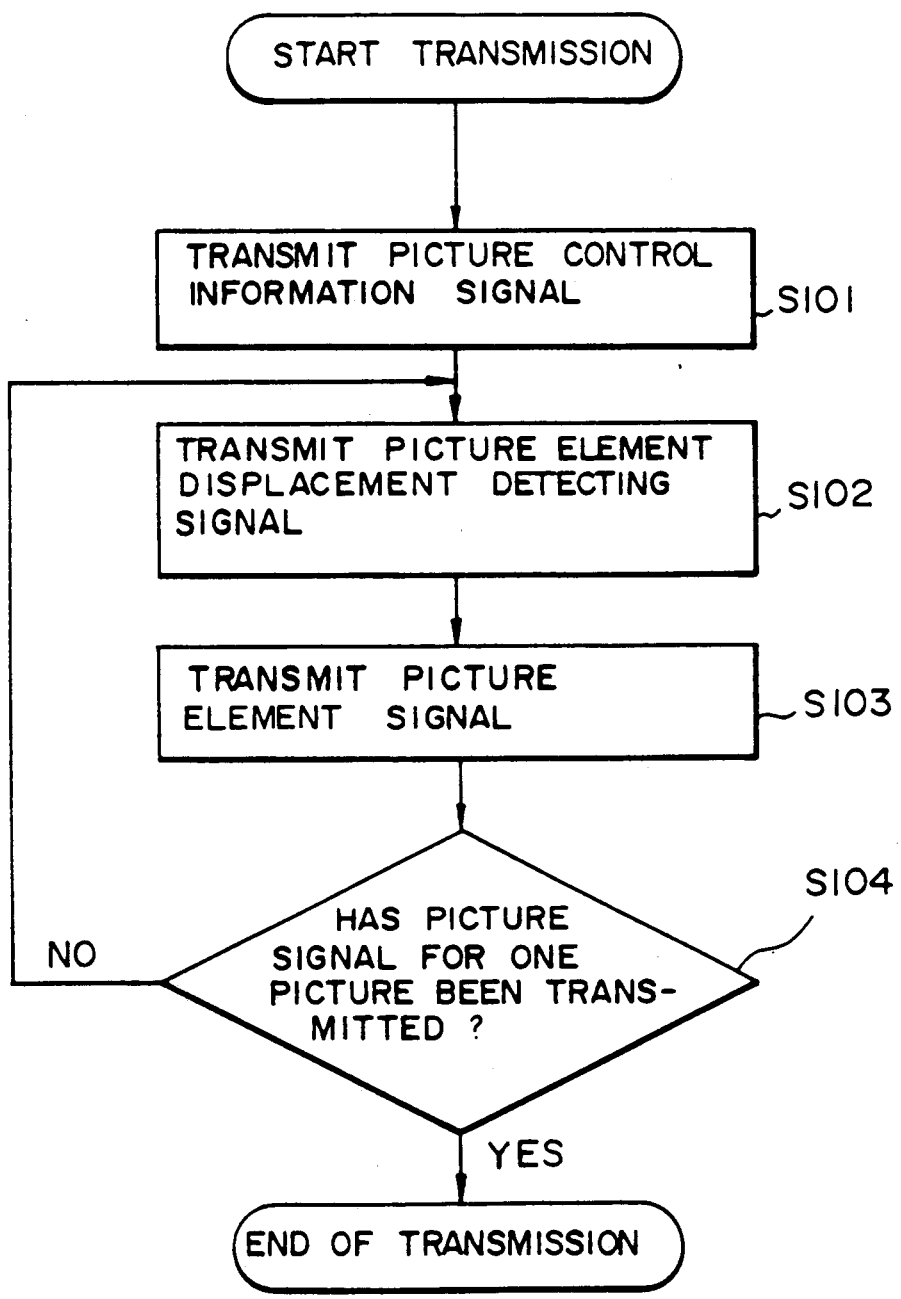
FIG. 4 is a sequence diagram showing the transmitting procedures of the system of FIG. 1.
Figure 5:
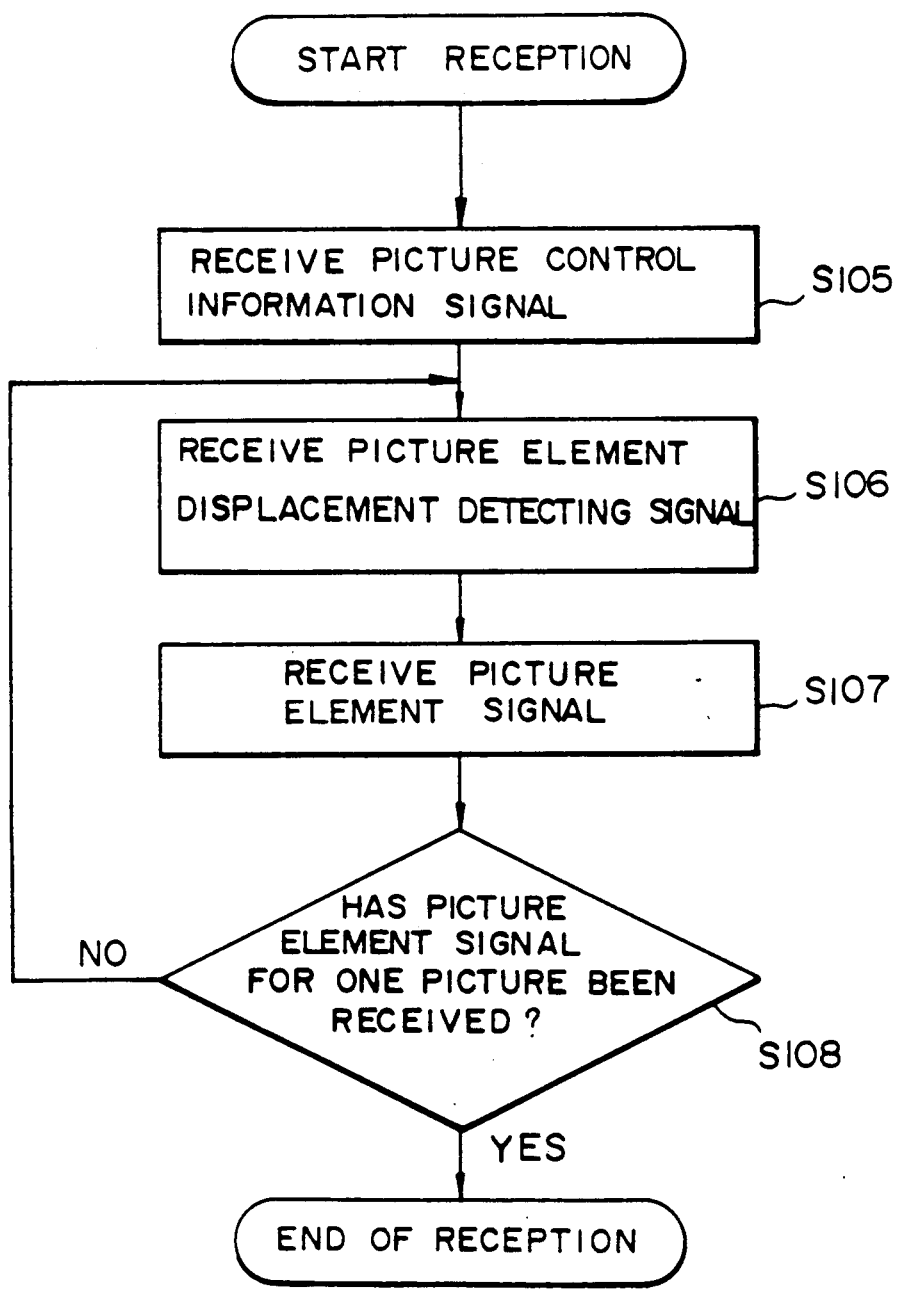
FIG. 5 is a sequence diagram showing the receiving procedures of the system of FIG. 1.

The transmission signal such as shown in FIG. 3 is transmitted by the steps of procedure of FIG. 4. Specifically, upon receipt of an instruction for transmission, a picture control information signal is transmitted (step S101). Then a picture element displacement detecting signal (step S102) and a picture element signal (step S103) are transmitted in order by a predetermined length; this is repeated until transmission of these signals for the entire area of a picture is completed.

Then the receiving action will be described.

Figure 6:
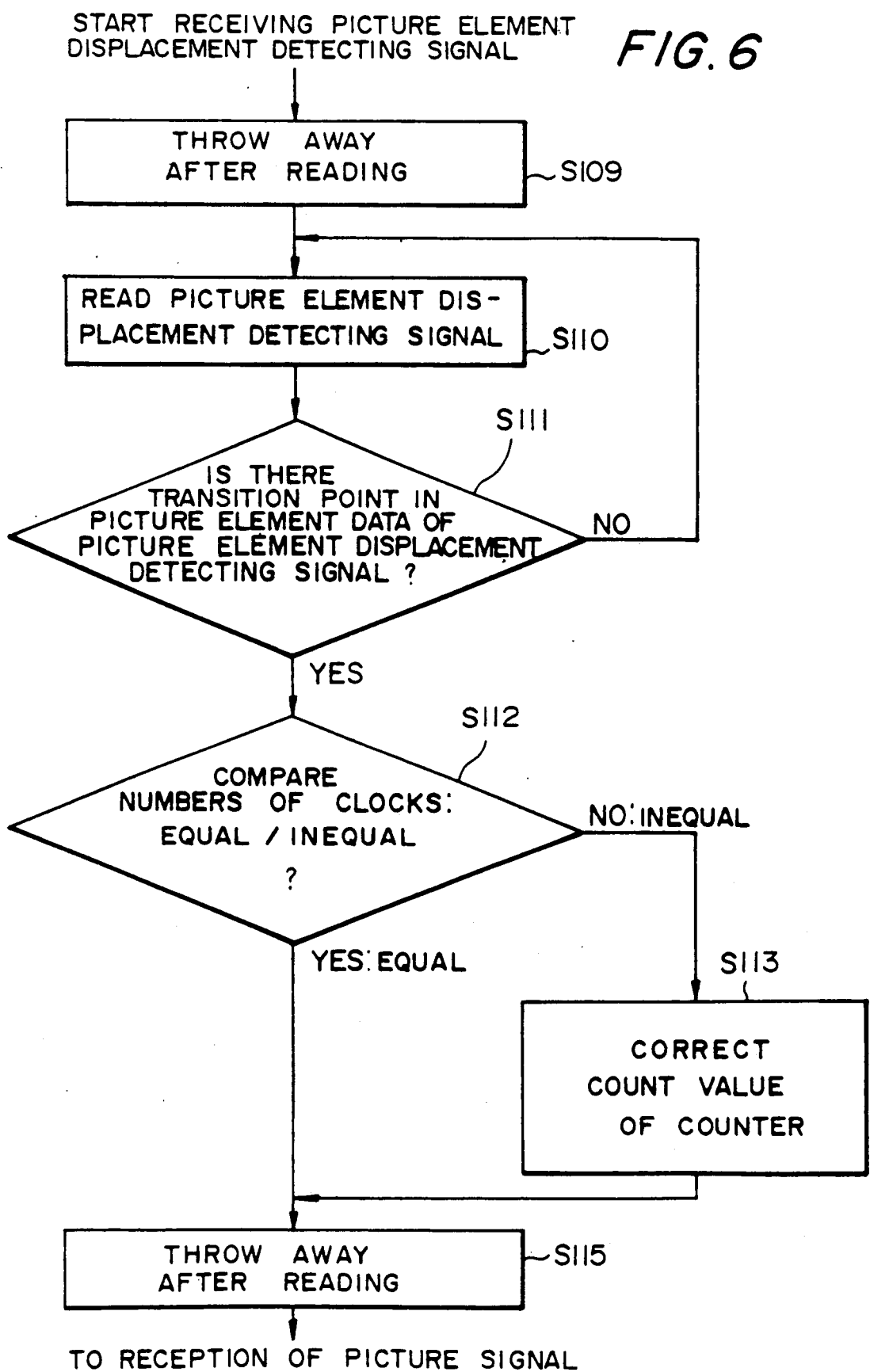
FIG. 6 is a sequence diagram showing the procedures for receiving the picture element displacement detecting signal of FIG. 5.
Figure 7:
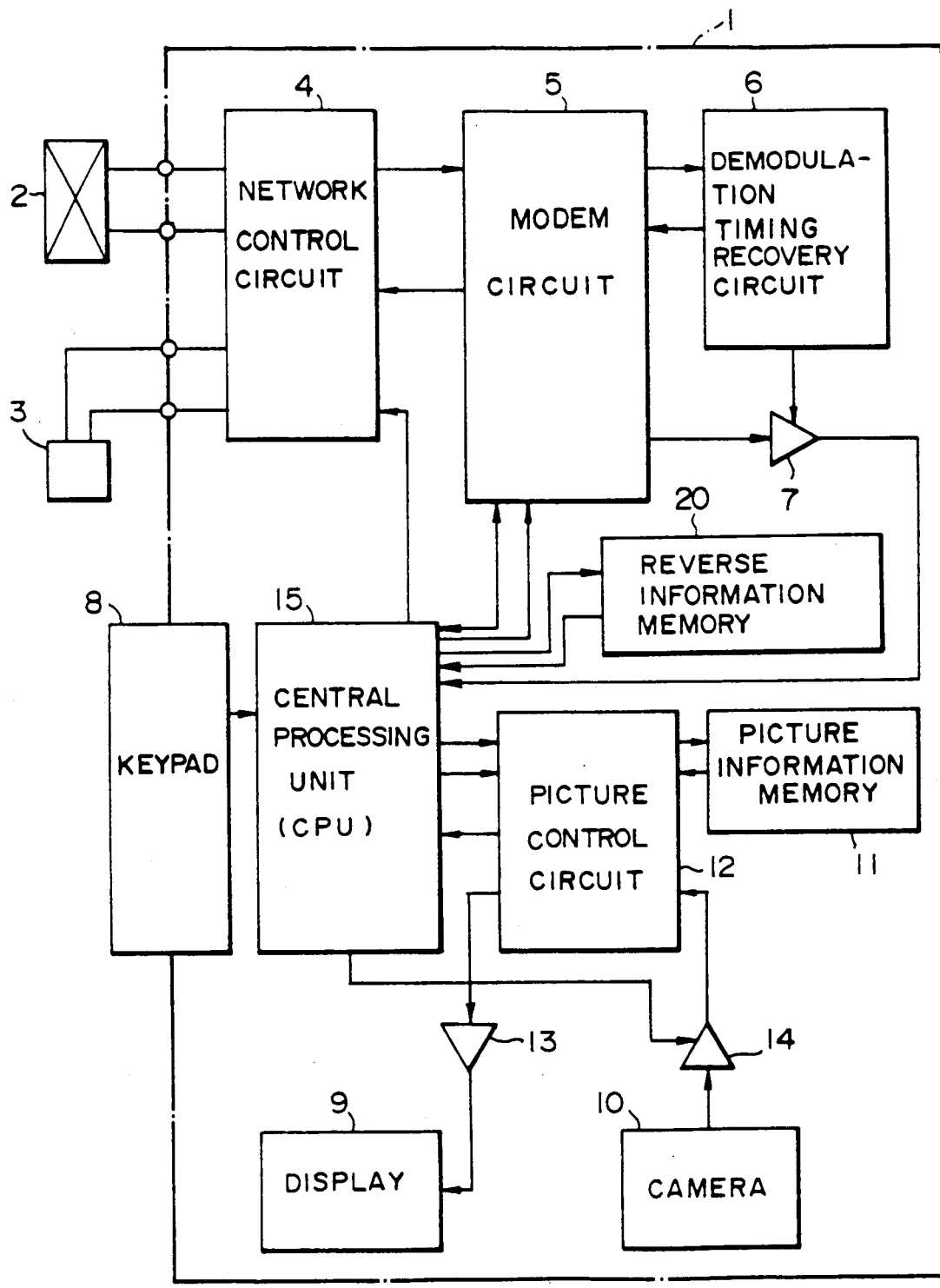
FIG. 7 is a block diagram showing a still image video telephone transmission system according to a second embodiment of this invention, in which the CPU performs transmitting and receiving process of a phase inversion detecting signal.

The picture control information signal is received (step S105), whereupon the picture element displacement detecting signal (step S106) and the picture element signal (step S107) are alternately received until receiving of these signals for the entire area of the picture is completed. FIG. 6 shows the detailed manner in which the picture element displacement detecting signal is received (step S106) at that time. Here signals for some picture elements are thrown away after reading (step S109). The reason why this throwing is necessary is that in the presence of a picture element displacement, a signal which must be a picture element displacement detecting signal is occasionally and practically a picture element signal, followed by reading the picture element displacement detecting signal (step S110).

When the transitional position at which the phase of a signal received is changed (i.e., a point at which an individual picture element is inverted from black to white and vice versa) is detected, discrimination is made (step S112) on whether or not the counted number of picture elements received at that time coincides with a predetermined value. Specifically, discrimination is made (step S112) on whether the number of picture elements received from the phase inversion position of the previously received picture element displacement detecting signal to the phase inversion position of the present picture element displacement detecting signal is correct or not. If it is not correct, count number correcting information is transmitted (step S113). In the example of FIG. 2, the phase inversion point is located at the boundary between the fourth cycle and the fifth cycle. Assuming that a picture element displacement occurs, this position will be detected as being displaced. For example, if the transition point is earlier than the regular count number by one count, this means that there is a displacement by one picture element. Now the count number is corrected to the regular one (step S113) so that a further picture element displacement will be prevented. Then the remaining picture element displacement preventing signal is thrown away after reading (step S115) to terminate receiving of succeeding picture element displacement preventing signals, whereupon the procedure proceeds to receiving of a picture signal (step S107).

According to this embodiment, it is possible to prevent any picture element displacement and hence to reproduce a clear picture by transferring a picture element displacement detecting signal having a predetermined value to a predetermined position of a picture signal and by detecting the phase inversion point of the picture element displacement detecting signal on the receiving side.

FIGS. 7 through 13 show a second embodiment of the system.

Construction

This system is the prior art system plus an inverted information memory 20. The inverted information memory 20 is a circuit for storing the presence and absence of inversion occurrence of individual block. Upon receipt of signals for the entire picture and based on the information stored in the inverted information memory 20. A CPU 15 makes a correction to the picture information stored in a picture information memory 11 via an image control unit 12.

Figure 8:
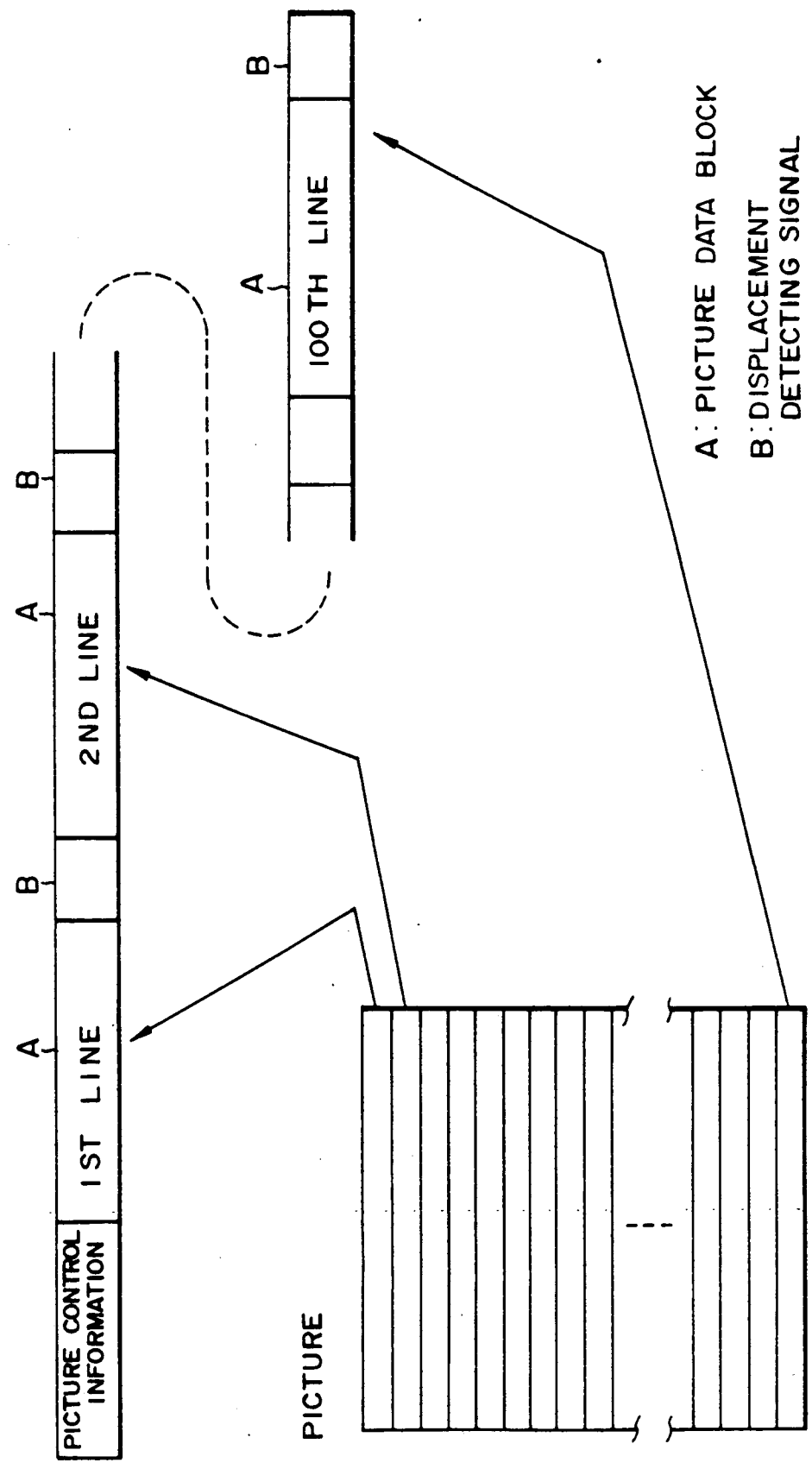
FIG. 8 is a diagram showing the transmission system of the screen picture frame signal outputted by the system of FIG. 7 and showing that the phase inversion detecting signal is inserted into each picture block.
Figure 9:
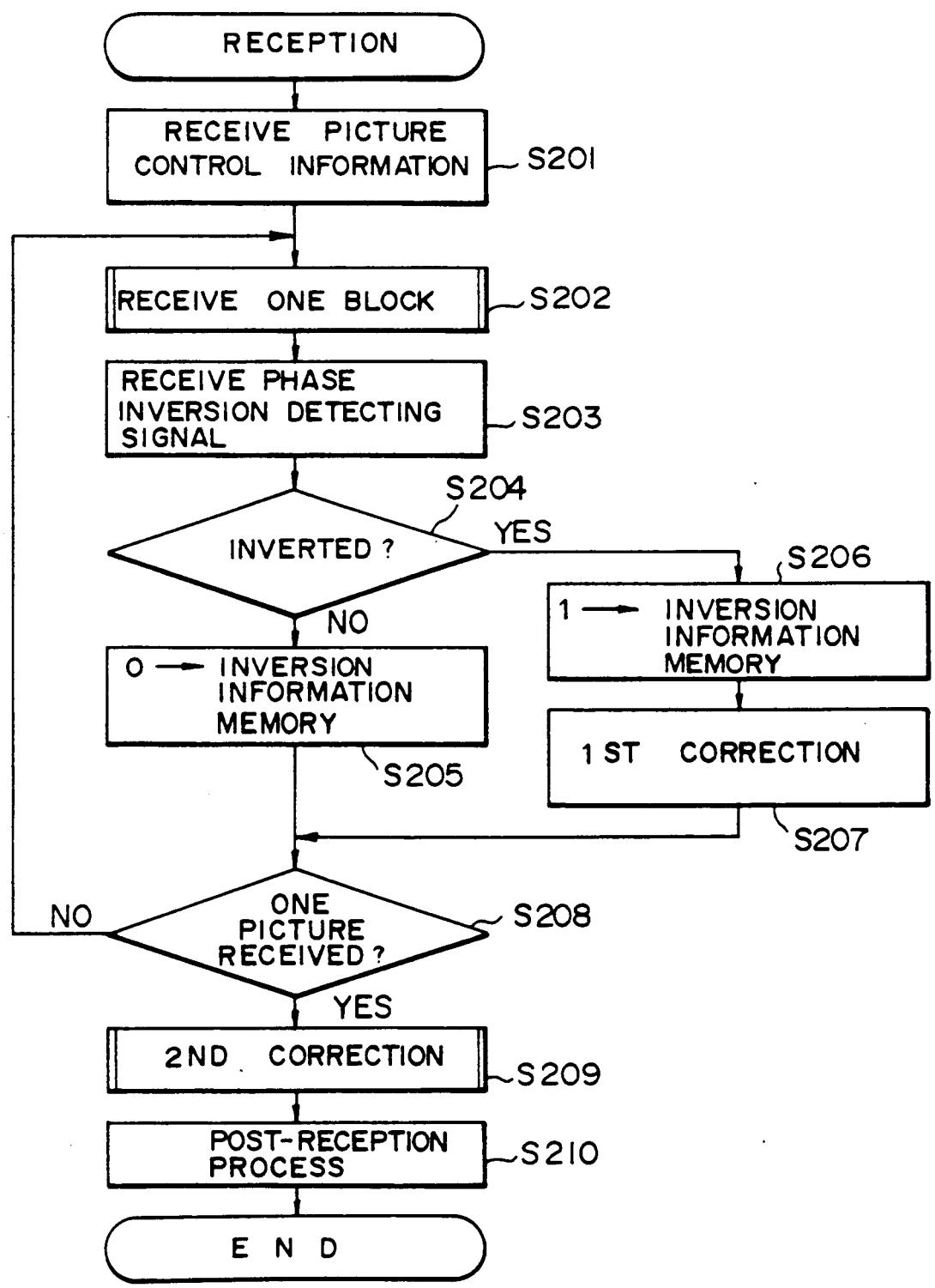
FIG. 9 is a sequence diagram showing the receiving procedures of the system of FIG. 7.

FIG. 8 shows an image data format to be employed in the second embodiment. In the format of FIG. 8, picture control information, a picture data block and an inversion detecting signal are transmitted. Here in the illustrated example, an inversion detecting signal is inserted between adjacent blocks, each including picture data for one line. The practical operation of the system is realized by software process of a CPU.

Operation

The transmitting action will be described first.

Figure 13:
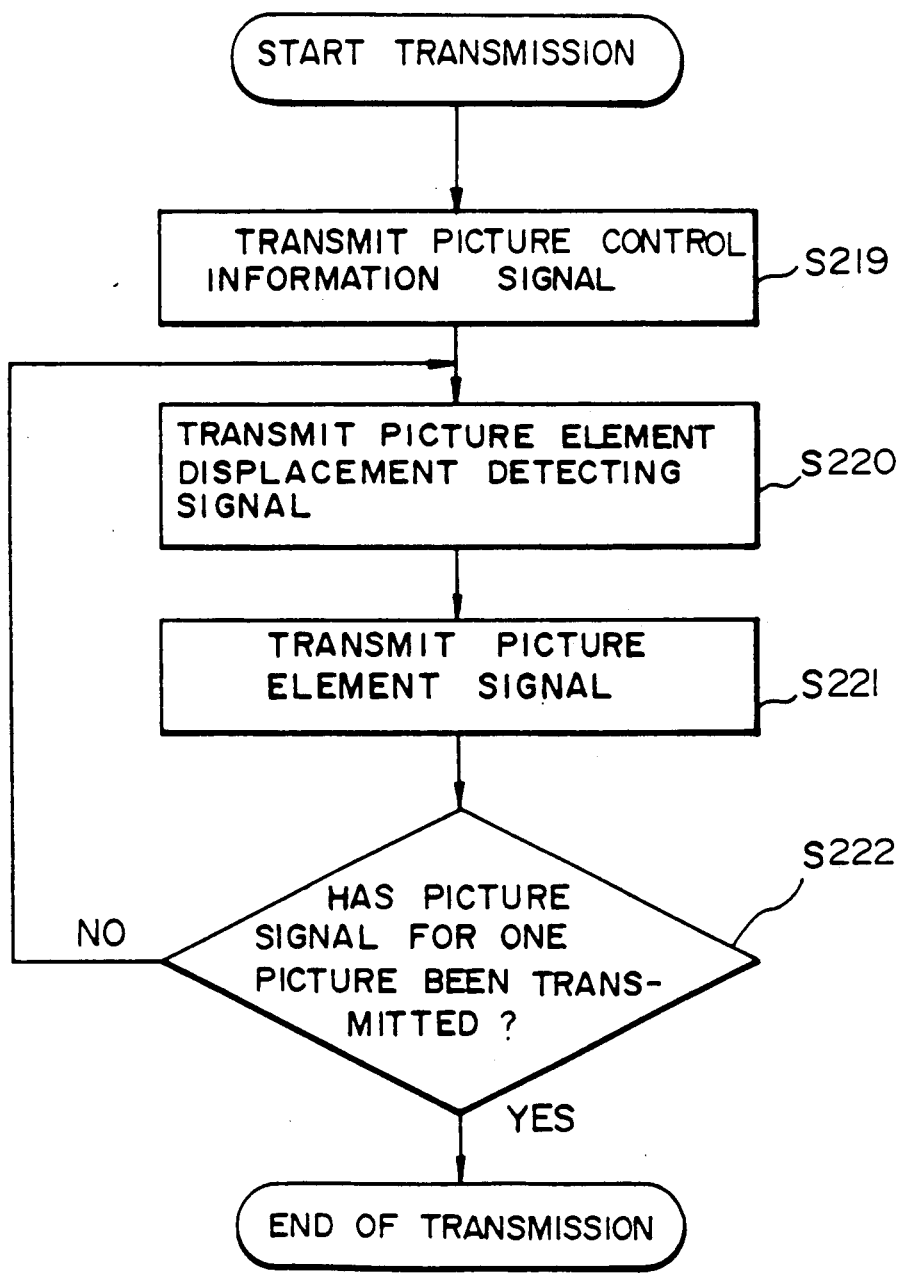
FIG. 13 is a flow diagram showing the transmitting procedures of the still image video telephone transmission system of the second embodiment.
Figure 14:
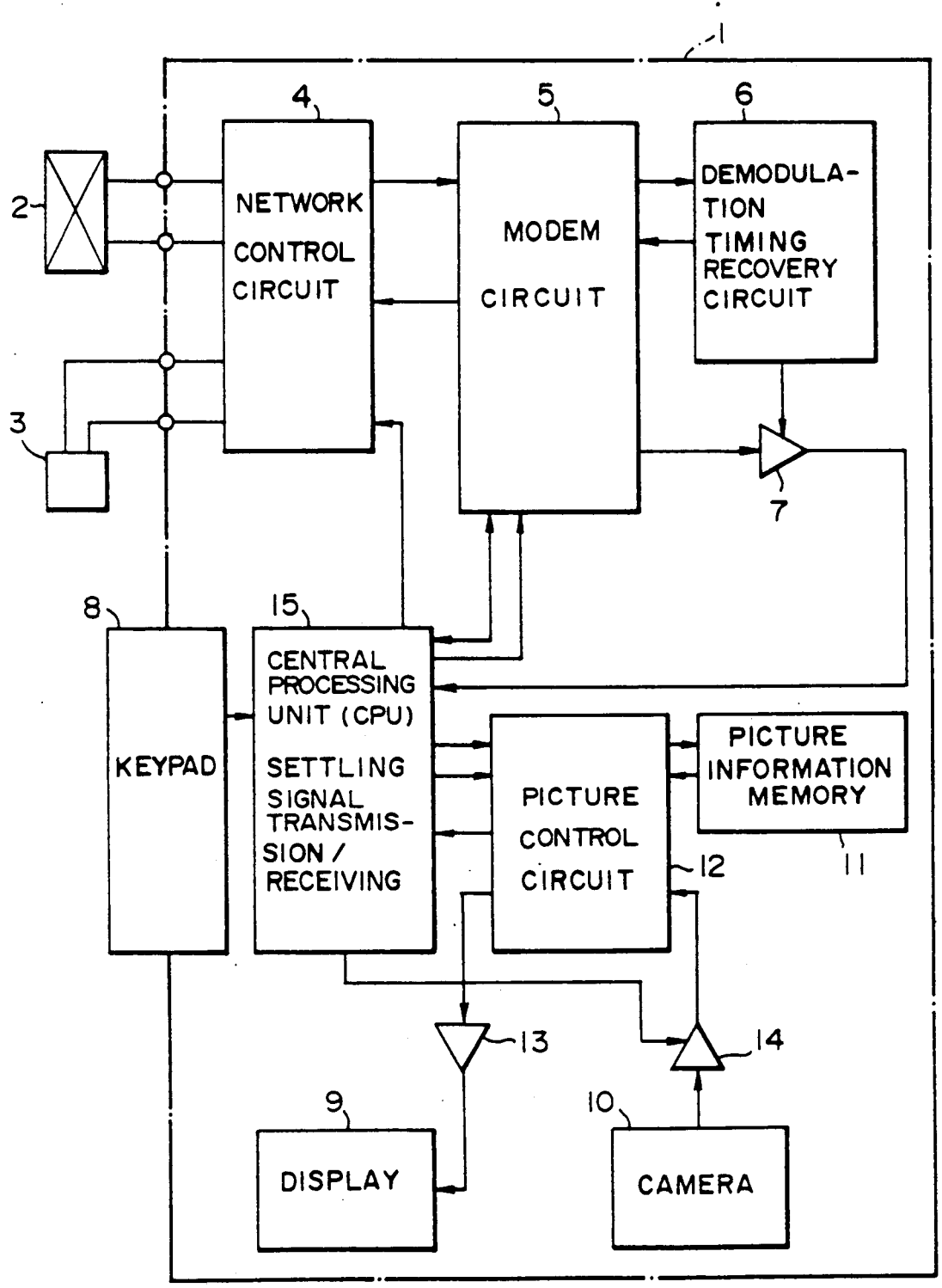
FIG. 14 is a block diagram showing a third embodiment of this invention, in which the CPU performs transmitting and receiving process of a settling signal.

The transmitting action of this system is identical with that of the prior art system, except that an inversion detecting signal is transmitted. A signal shown in FIG. 8 is transmitted. FIG. 13 shows the procedure of this transmitting. Specifically, upon receipt of an instruction for transmission, a picture control information signal is transmitted (step S219). Then a picture element signal and a picture inversion detecting signal for one line are transmitted in order by a predetermined length (steps S220, S221); thereafter this is repeated until transmission of these signals for the entire area of a picture is completed.

Figure 12:
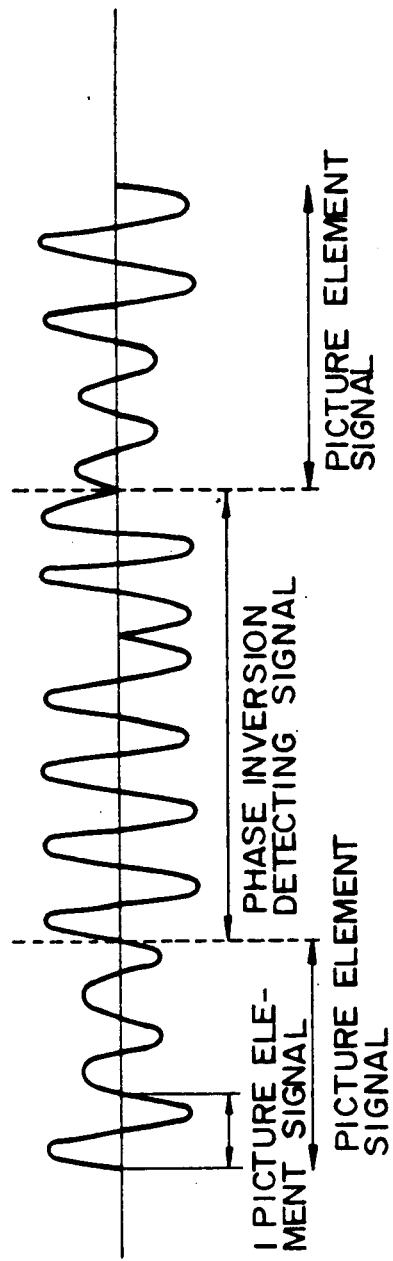
FIG. 12 is a diagram showing waveforms of a phase inversion detecting signal which is included in a screen picture frame signal outputted by the system of the second embodiment, the waveforms having a predetermined phase and amplitude.

The picture inversion detecting signal, as shown in FIG. 12, includes several cycles of a signal having a predetermined phase.

Then the receiving action will be described.

Figure 10:
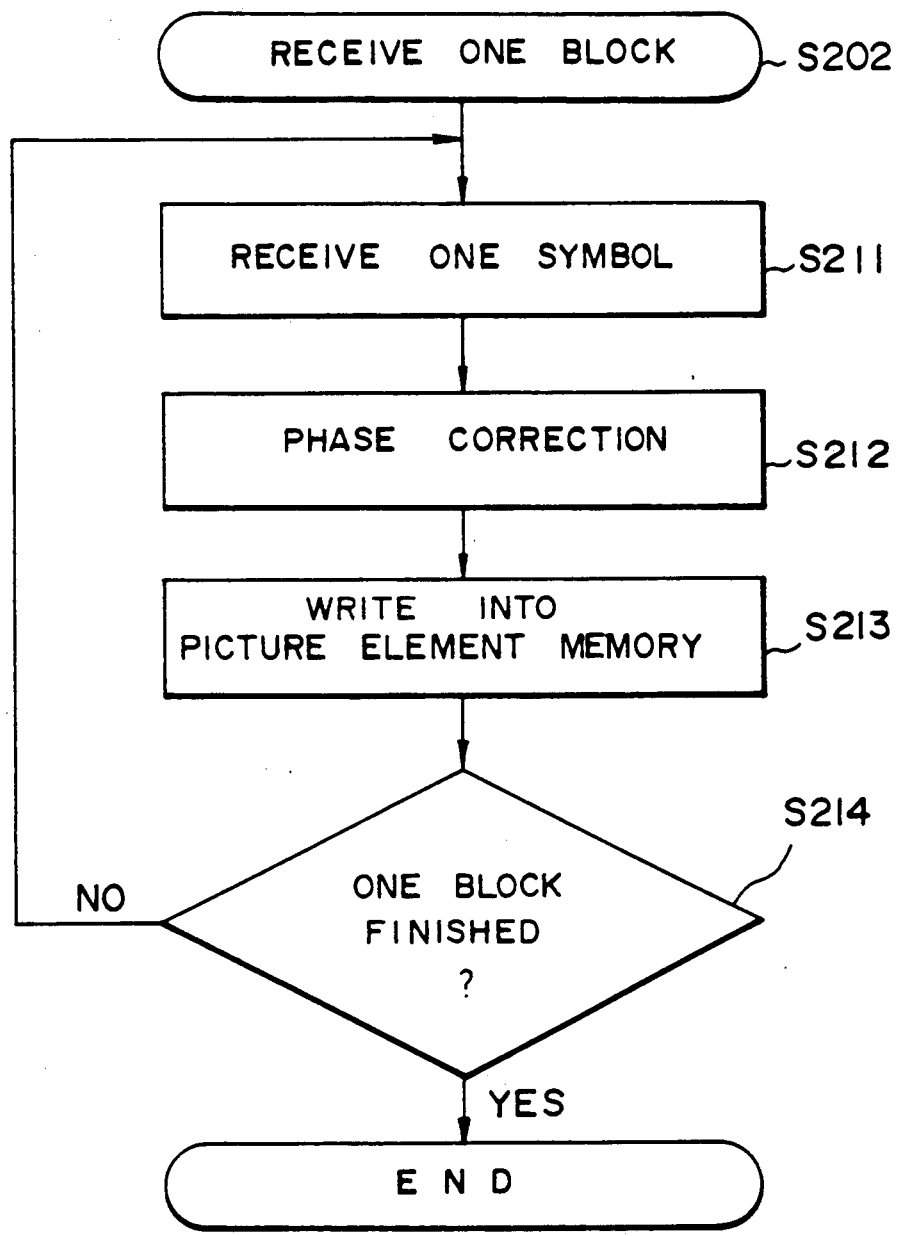
FIG. 10 is a sequence diagram showing the procedures for receiving a signal for one block in the system of FIG. 7.

The picture control information is received (step S201), and a block of picture data is received (step S202). FIG. 10 illustrates the detailed manner in which the block of picture data is received (step S202). Firstly one symbol is received (step S211), phase correction is made to the received data (step S213) and the corrected data are stored (step S213) in the picture information memory 11. If it does not reach the number of symbols of one block, the procedure is returned to step S211. Otherwise, the procedure is terminated.

Subsequently, a phase inversion detecting signal is received (step S203), and discrimination is made (step S204) on whether phase inversion is present or not while the block of picture data is received, whereupon the result of discrimination is stored (steps S205, S206) in an inversion information memory 20. The presence and absence of phase inversion can be easily discriminated based on whether a phase inversion signal coincides with a predetermined picture element signal. In the presence of phase inversion, a phase correction (step S212) is inverted (step S207) for the succeeding receiving.

Figure 11:
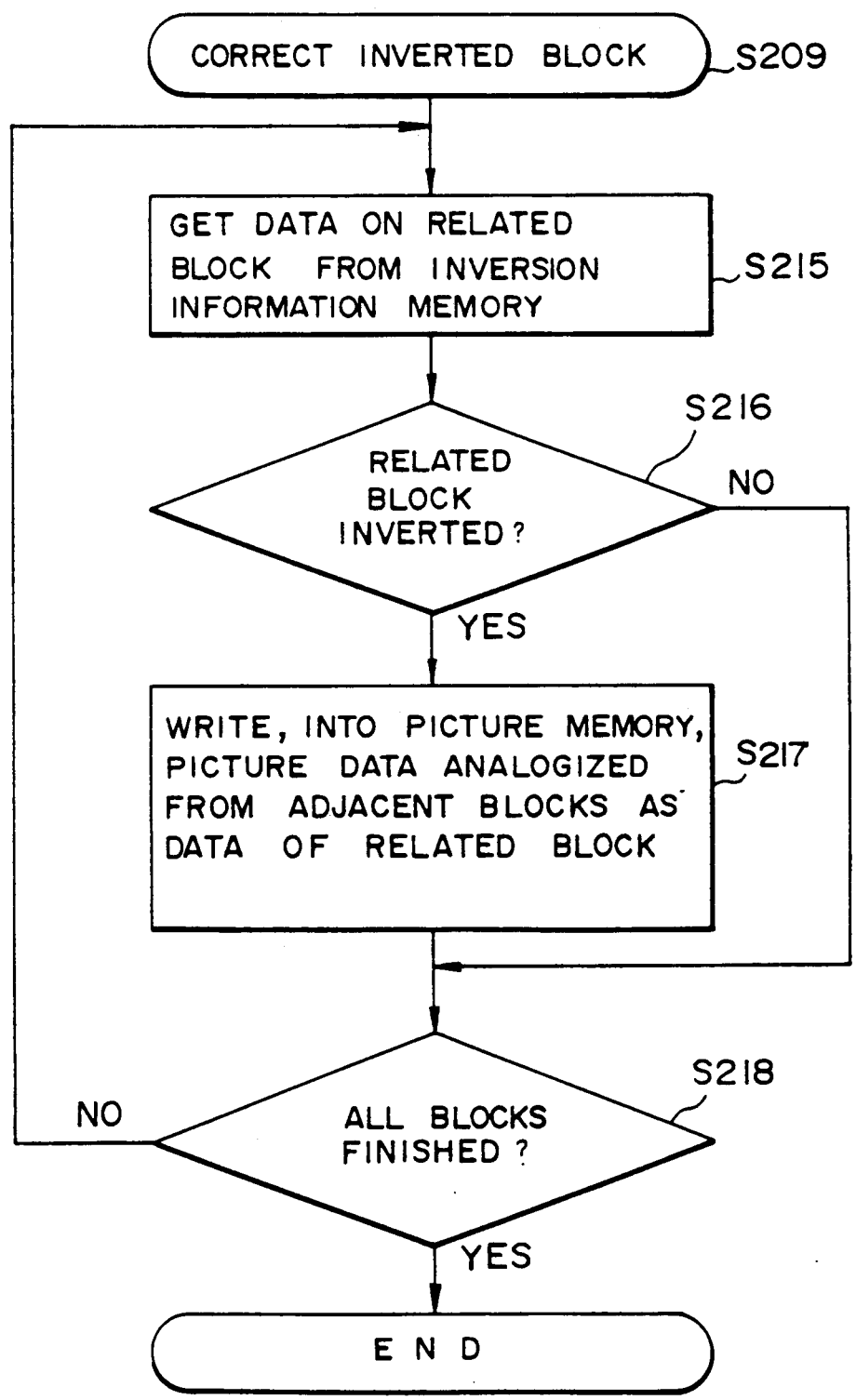
FIG. 11 is a sequence diagram showing the procedures for correcting an inverted block.

Then discrimination is made (step S208) on whether the receiving of picture data for the entire area of a picture is completed or not. If completed, the picture data of the block in which inversion occurred are corrected (step S209). FIG. 11 illustrates the detailed manner in which this correcting (step S209) is performed.

Upon receipt, from the inversion information memory, the information corresponding to the block of initial picture data (step S215), discrimination is made (step S216) on whether or not phase inversion is present in this block. If inversion occurred, picture data of a nearest block which is devoid of inversion are read from the picture information memory 11 and stored (step S217) therein the picture data of this block. And the number of blocks is discriminated; if the correction for all blocks is not completed, the procedure is returned to step S215 to perform correction to the next block.

Finally, the process subsequent to receiving is performed (step S210), and thus the picture receiving action is terminated.

The succeeding data can be received correctly only by giving an instruction from the CPU 15 to the modem unit 5 to correct the succeeding data and to output the corrected data.

According to this embodiment, it is possible to reproduce a clear picture by inserting, in a predetermined position of a picture signal, a phase inversion detecting signal with a predetermined value at regular time intervals and transmitting the combined signal, and on the receiving side, by detecting phase inversion to prevent inversion of the received picture and by correcting the inverted portion by using other data.

FIGS. 14 through 18 show a third embodiment of the system.

Construction

The construction of the system of the first embodiment is similar to that of the prior art system and is realized by software process of a CPU.

Figure 15:
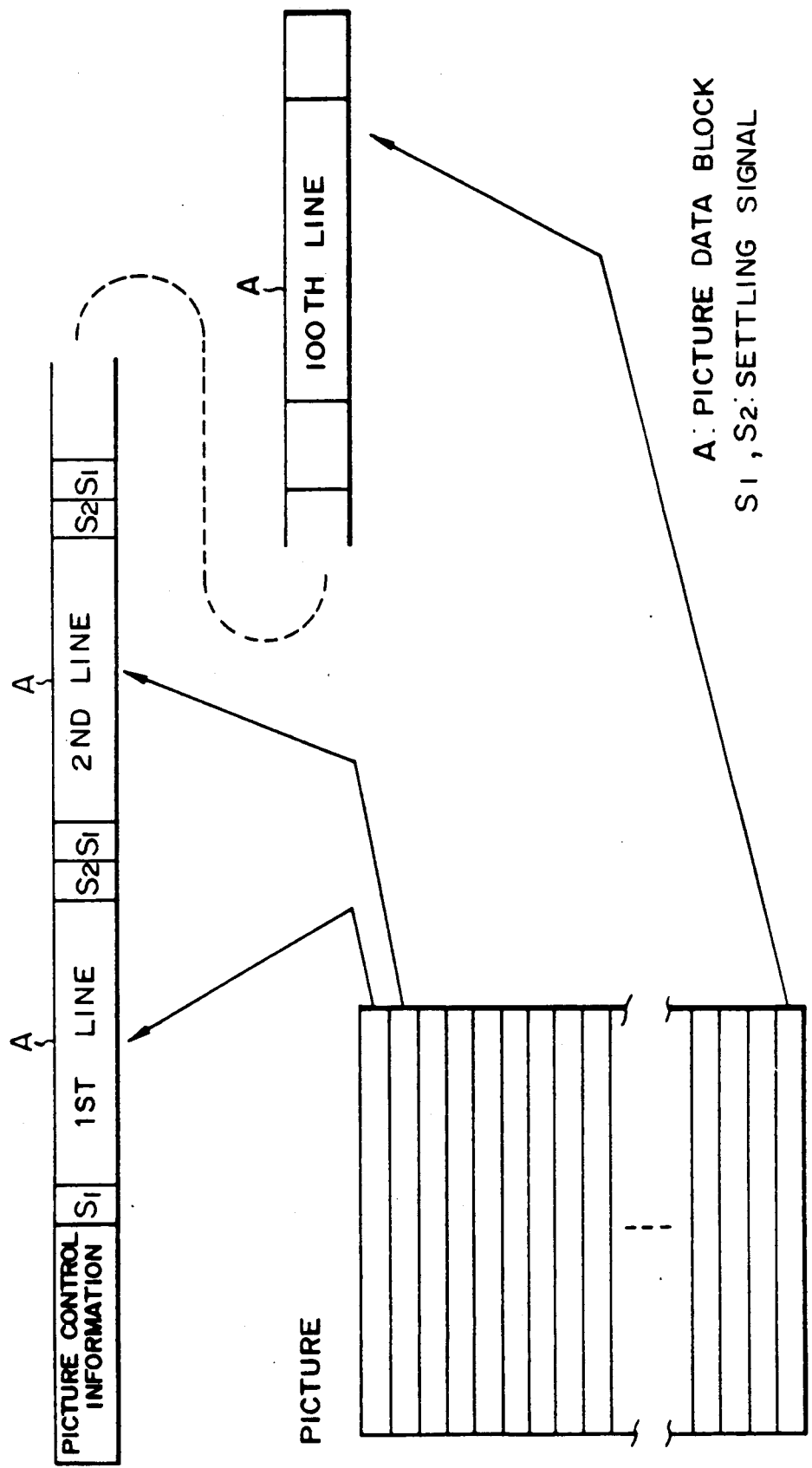
FIG. 15 is a diagram showing the transmission system of the screen picture frame signal outputted by the system of the third embodiment.

FIG. 15 shows a transmission signal that is provided by adding a settling signal to the conventional one.

FIG. 16 shows the case of a monochromatic picture; before transmitting the first cycle of each line, a signal $S_1$ identical with that signal is transmitted, and after transmitting the final cycle of each line, a signal $S_2$ identical with that signal is transmitted.

FIG. 17 shows the case of a color picture; likewise, before and after transmitting a color difference signal, the signals $S_1$, $S_2$ are transmitted.

Operation

The transmitting action will be described first.

Figure 18:
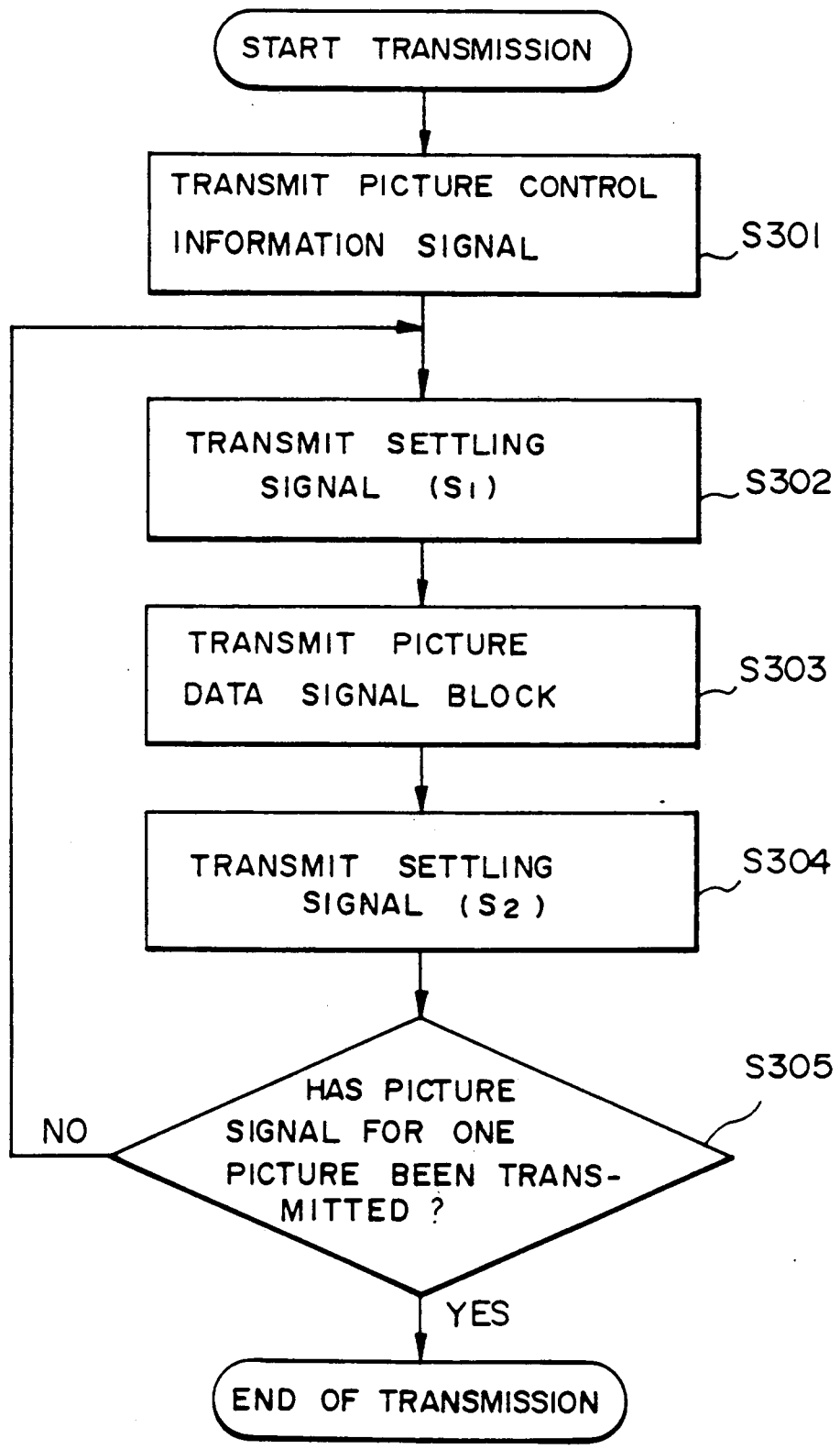
FIG. 18 is a sequence diagram showing the transmitting procedures of the system of the third embodiment.

The transmitting action of this system is identical with that of the prior art system, except that a settling pulse is inserted. FIG. 18 shows the procedure of this transmitting. Upon receipt of an instruction for transmission, a picture control information signal is transmitted (step S301). Then a block of picture data is transmitted (step S303), before and after which settling signals $S_1$, $S_2$ are transmitted (steps S302, 304). Finally, discrimination is made (step S305) on whether all of the signals are transmitted or not, thus terminating the transmitting action.

Then the receiving action will be described.

Figure 19:
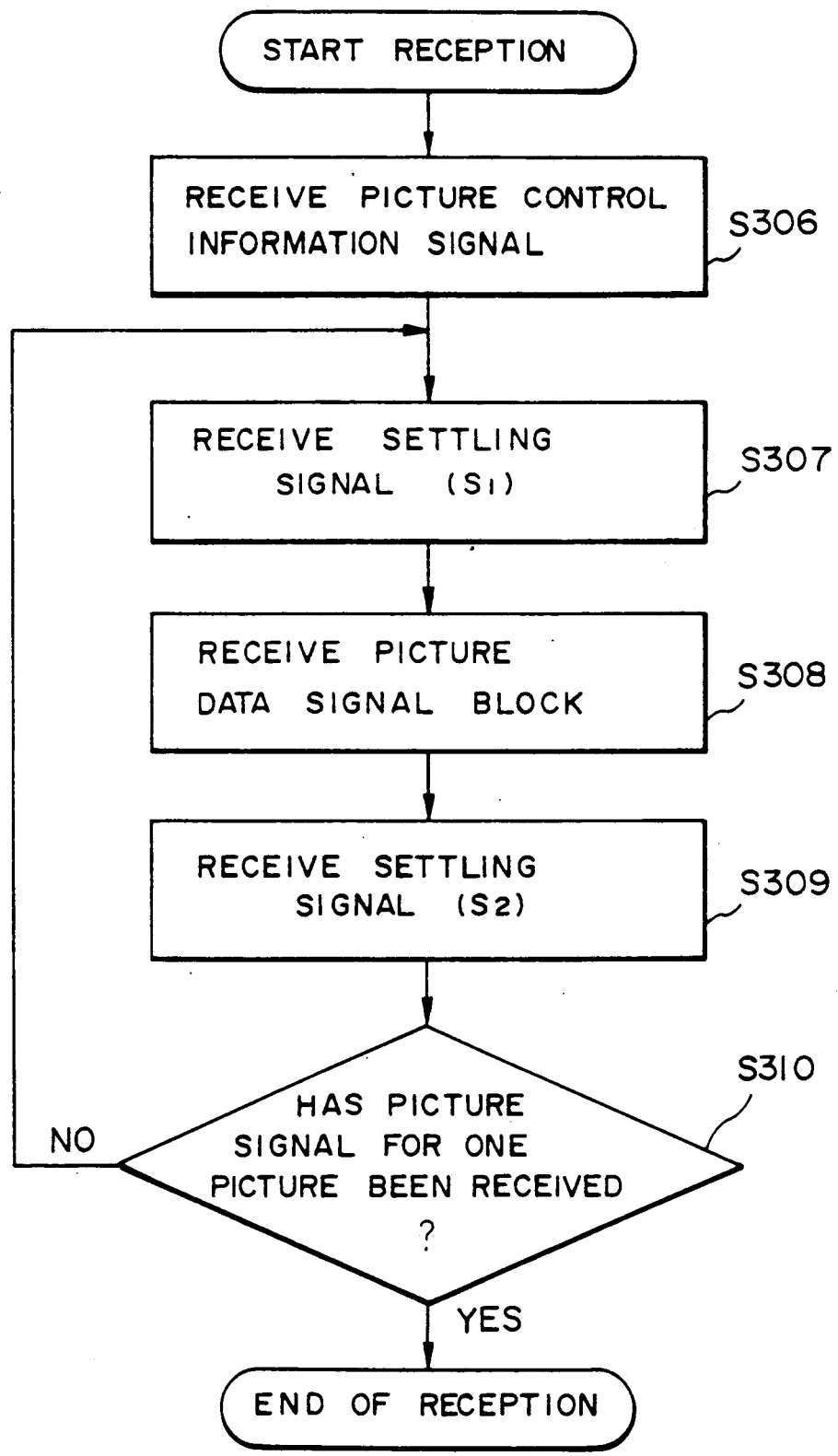
FIG. 19 is a sequence diagram showing the receiving procedures of the system of the second embodiment.
Figure 20:
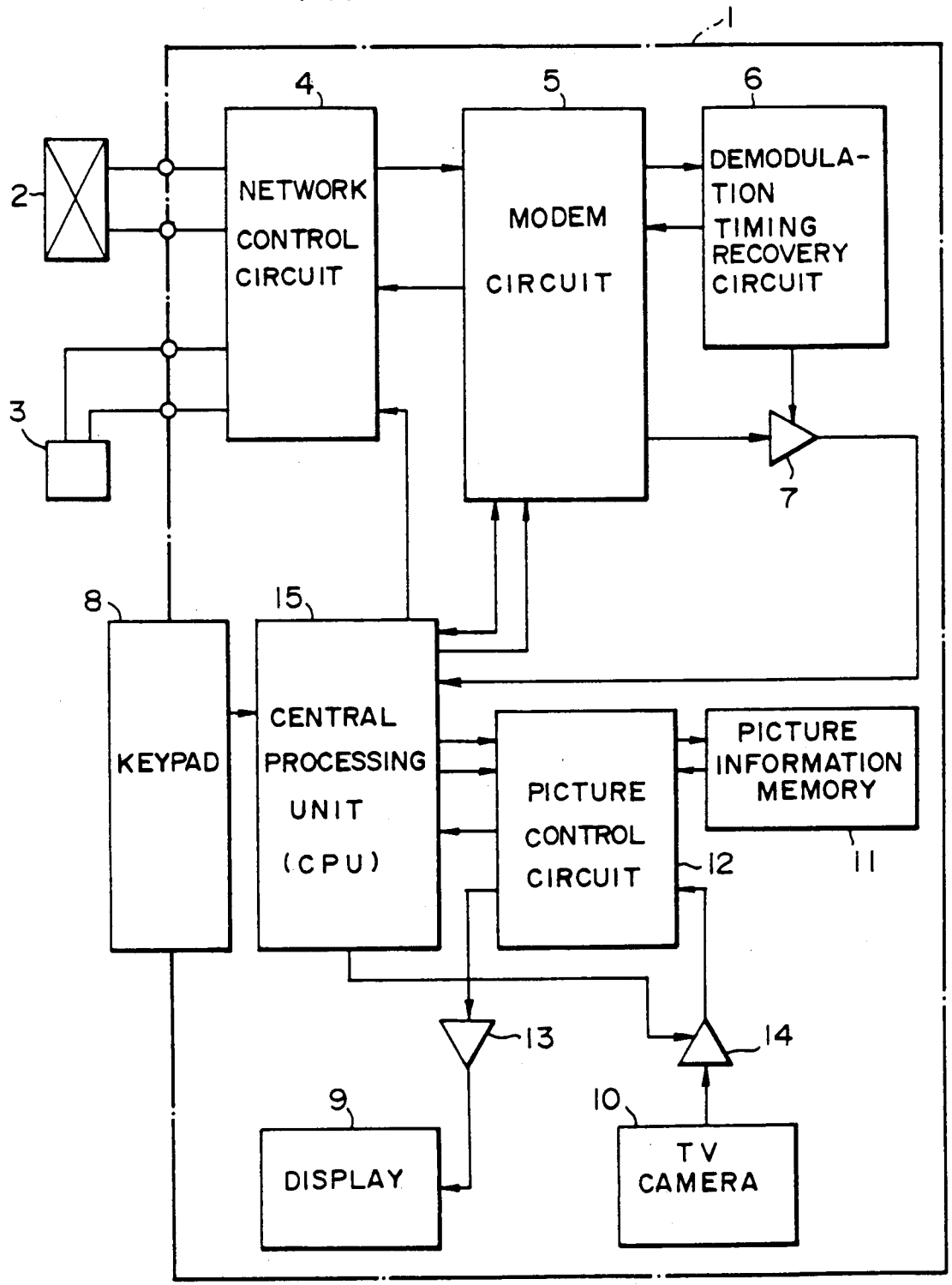
FIG. 20 is a block diagram showing a conventional still image video telephone transmission system.
Figure 21:
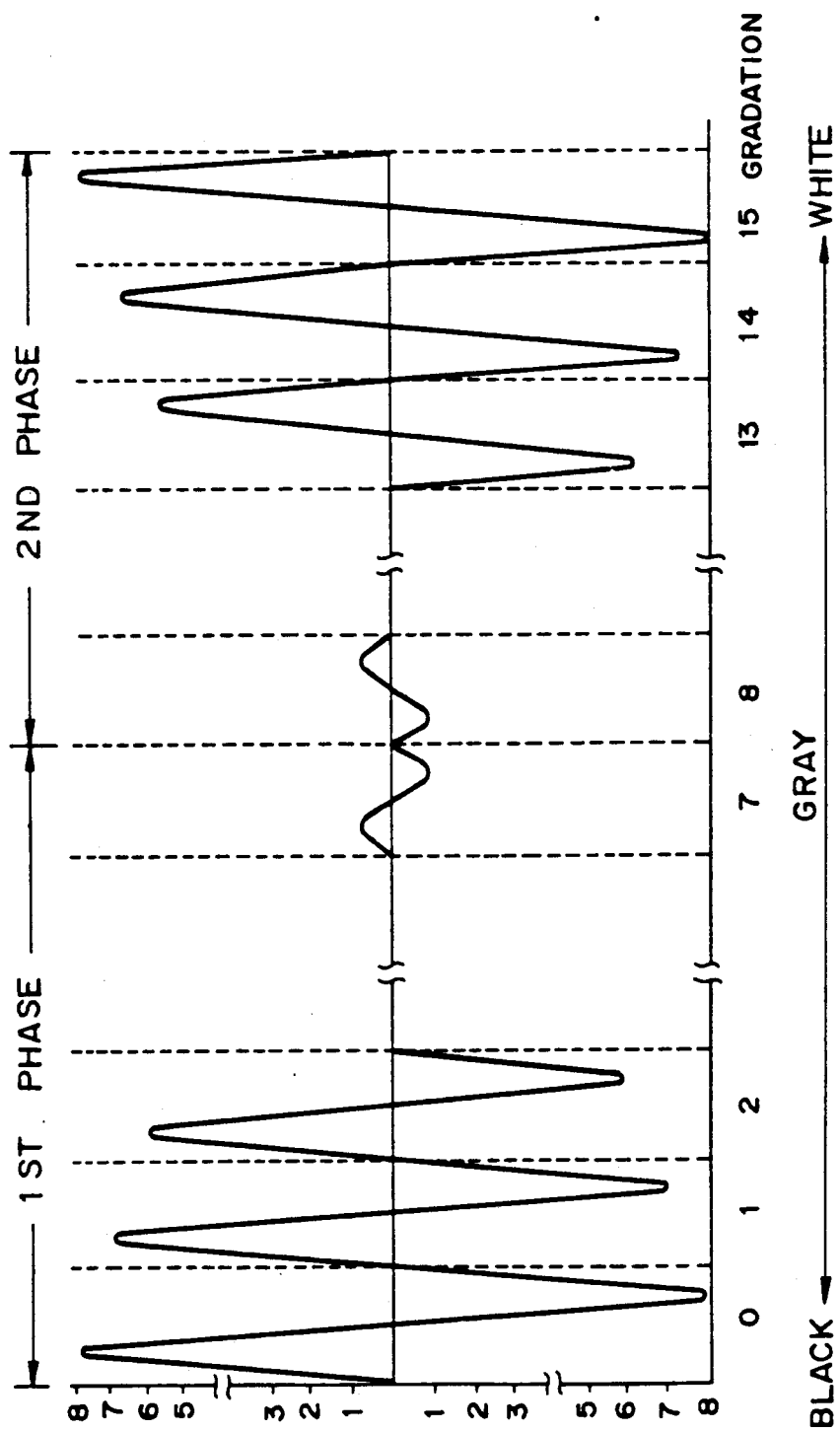
FIG. 21 is a diagram showing the system for modulating the picture element signal output by the system of FIG. 20.
Figure 22:
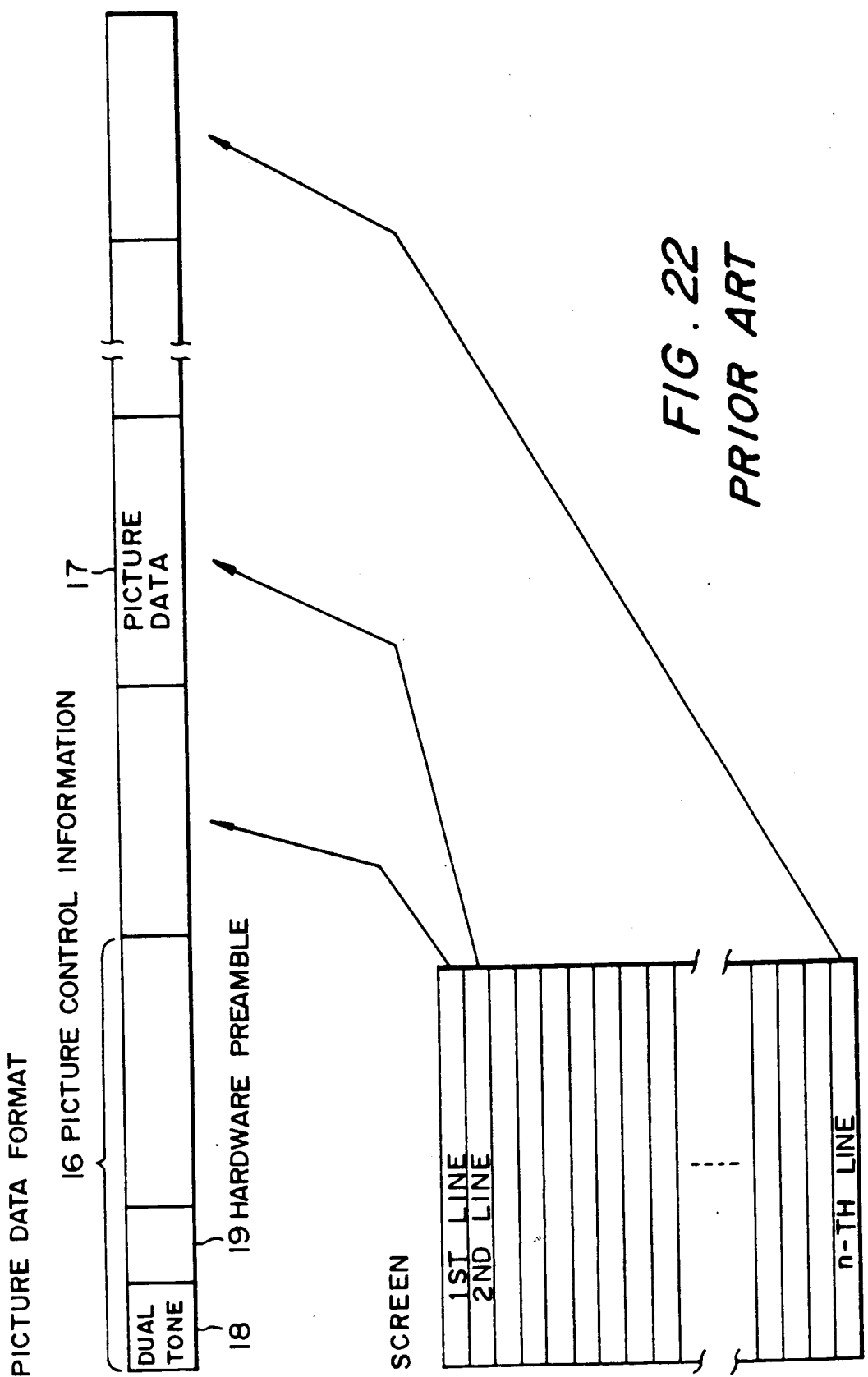
FIG. 22 is a diagram showing the transmission system of the screen picture frame signal of the system of FIG. 20.

FIG. 19 shows the receiving procedure. Firstly, receiving of picture control information is performed (step S306). Then receiving of picture data is performed. Since the positions of the settling signals $S_l$, $S_2$ are predetermined, it is possible to discriminate and skip (steps S307, S309) the settling signals $S_1$, $S_2$ with ease by counting the number of picture data received on the receiving side, so that it is possible to store only the picture data in the picture information memory 11. Finally, discrimination is made (step S310) on whether all of the signals are received or not, thus terminating the receiving action.

Thus by inserting the settling signals, it is possible to realize a still image which is free from any turbulence at either end.

What is claimed is:

1. A still image video telephone transmission system for transmitting and receiving, via telephone lines, a still picture taken by a camera, comprising:
    (a) a transmitting means including means for converting analog signals from a video camera into digital signals, means for modulating phase and amplitude of the digital signals, composing a screen picture frame signal including a plurality of groups of picture blocks made of a plurality of picture element signals, and transmitting the signal, and means for adding a picture correcting signal to each picture element signal or a picture block; and
    (b) a receiving means including means for receiving the screen picture frame signal, means for demodulating the picture frame signal, means for subjecting the frame signal to D/A conversion, means for indicating a still picture on a display, means for extracting clocks from the received screen picture frame signal, means for demodulating picture element signals of the screen picture frame signal into picture element data, a picture memory for counting the clocks and storing picture element data by using a counted value as an address, and a correcting means for correcting the picture element data in the picture memory according to a condition of the extracted picture correcting signal.

2. A still image video telephone transmission system according to claim 1, wherein the picture correcting signal is a pair of picture element displacement detecting signals having two different predetermined phases and amplitudes.

3. A still image video telephone transmission system according to claim 2, wherein the pair of the picture element displacement detecting signals are picture element signals having a plurality of cycles.

4. A still image video telephone transmission system according to claim 2, wherein the pair of the picture element displacement detecting signals are two different picture element signals corresponding to picture element data for white and black colors, respectively.

5. A still image video telephone transmission system according to claim 1, wherein the correcting means includes:
    (a) a counter means for counting the number of clocks between a predetermined transition point of a pair of picture element signals in the received picture element displacement detecting signal and another transition point in a pair of picture element signals in a succeeding picture element displacement detecting signal;
    (b) means for determining whether or not the number of counted clocks is equal to the predetermined number of clocks existing between two transition points;
    (c) a differential means for determining that there exists picture element displacement when the above two numbers are not equal to each other, and for calculating the difference between the number of counted clocks and the predetermined number of clocks existing between the two transition point; and
    (d) a reloading means for correcting and reloading a differential address of picture element data stored in a picture element memory succeeding a picture element memory where picture element displacement has occurred.

6. A still image video telephone transmission system for transmitting and receiving, via telephone lines, a still picture taken by a camera, comprising:
    (a) a transmitting means including means for converting analog signals from a video camera into digital signals, means for modulating phase and amplitude of the digital signals, composing a screen picture frame signal including a plurality of groups of picture blocks made of a plurality of picture element signals, and transmitting the signal, and means for adding a phase inversion detecting signal to each picture element signal or a picture block; and
    (b) a receiving means including means for receiving the screen picture frame signal, means for demodulating the picture frame signal, means for subjecting the frame signal to D/A conversion, means for indicating a still picture on a display, means for extracting clocks from the received screen picture frame signal, means for demodulating picture element signals of the screen picture frame signal into picture element data, a picture memory for storing picture element data, means for storing picture element data, an inversion information memory for determining presence or absence of phase inversion based on the received phase inversion detecting signal and for storing a picture element number where phase inversion occurs, and a correcting means for correcting the picture element data in the picture memory according to the phase inversion information in the inversion information memory.

7. A still image video telephone transmission system according to claim 6, wherein the phase inversion detecting signal is a picture element signal having a predetermined phase and amplitude.

8. A still image video telephone transmission system according to claim 6, wherein the correcting means includes a first correcting means for inverting phases of picture element blocks succeeding the picture block where phase inversion has occurred, and for reloading picture block in the picture memory.

9. A still image video telephone transmission system according to claim 6, wherein the correcting means includes a second correcting means for replacing data of the picture block subjected to phase inversion in the picture memory with data of a picture block which is most adjacent to, before or after, a normal picture block, according to the picture block number stored in the inversion information memory.

10. A still image video telephone transmission system according to claim 6, wherein the phase inversion detecting signal is a' picture element signal having predetermined phase and amplitude.

11. A still image video telephone transmission system for transmitting and receiving, via telephone lines, a still picture taken by a camera, comprising:
(a) a transmitting means including (1) means for converting analog signals output from a video camera into digital signals, (2) means for modulating phase and amplitude of the digital signals and transmitting picture frame signal consisting of one or more picture element signals for one or more lines or files, and (3) means for adding a first settling signal which is same as the picture element signal at a leading edge of a line or file picture block to each line or to immediately before a line file picture block; and
(b) a receiving means including (3) means for demodulating the screen picture frame signal, (4) means for subjecting the screen picture frame signal to D/A conversion, (5) means for demodulating the first settling signal and the second settling signal into picture element data according to the received clocks, and (6) a image memory for storing the remaining picture element data.

* * * * *